No. 740,516. PATENTED OCT. 6, 1903.
A. BESSETTE.
REFRIGERATOR DRIP PAN ATTACHMENT.
APPLICATION FILED MAR. 16, 1903.

NO MODEL.

Witnesses
Wm J Jacobi
E. M. Brandt.

Inventor
Aldei Bessette
By
E. N. Bond
Attorney

No. 740,516. Patented October 6, 1903.

UNITED STATES PATENT OFFICE.

ALDEI BESSETTE, OF DANIELSON, CONNECTICUT.

REFRIGERATOR DRIP-PAN ATTACHMENT.

SPECIFICATION forming part of Letters Patent No. 740,516, dated October 6, 1903.

Application filed March 16, 1903. Serial No. 147,987. (No model.)

*To all whom it may concern:*

Be it known that I, ALDEI BESSETTE, a citizen of the United States of America, and a resident of Danielson, in the county of Windham and State of Connecticut, have invented certain new and useful Improvements in Refrigerator Drip-Pan Attachments, of which the following is a specification.

This invention relates to certain new and useful improvements in drip-pan attachments for refrigerators and the like of that class in which there is provided an alarm to indicate when the water in the pan has reached a predetermined height.

The present invention has for its object, among others, to provide a simple and durable and efficient device of this character which can be readily applied to the pan or removed therefrom to provide for the adjustment of the device to regulate to a certain extent the water or the height thereof at which the float shall act to sound the alarm.

The device is simple in its nature, composed of but few parts, those readily affixed in position and positive in their action.

Other objects and advantages of the invention will hereinafter appear, and the novel features thereof will be specifically defined by the appended claims.

The invention is clearly illustrated in the accompanying drawings, which, with the numerals of reference marked thereon, form a part of this specification, and in which—

Figure 1:
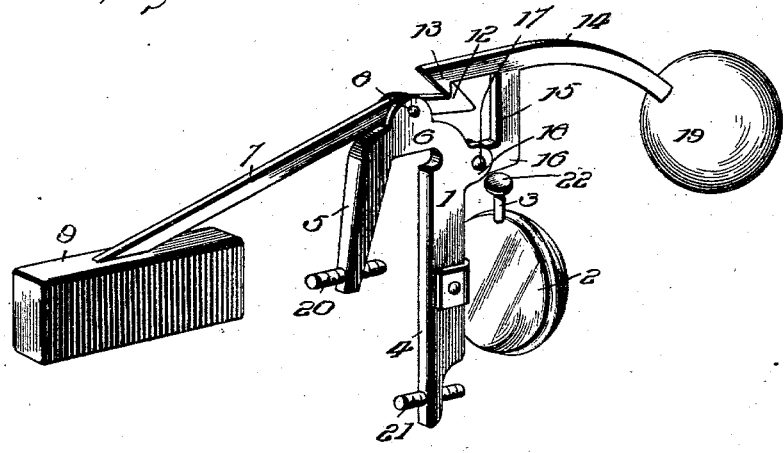
Figure 2:
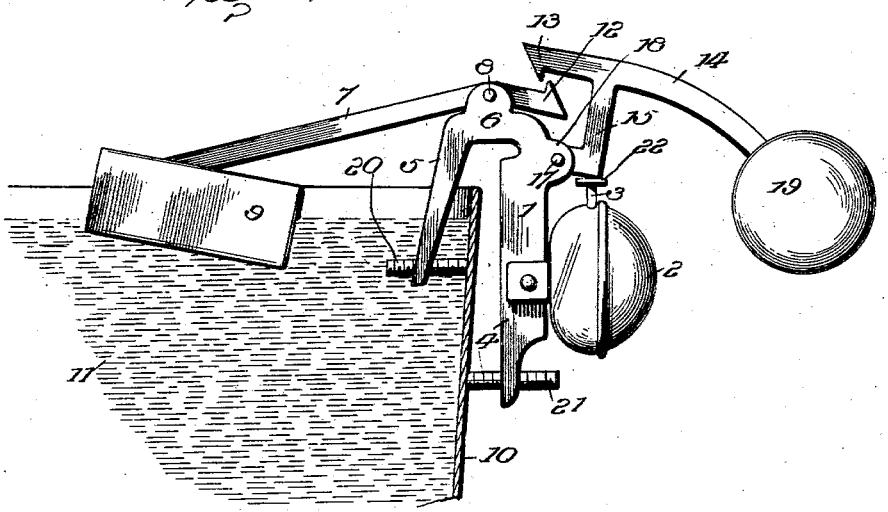

Figure 1 is a perspective view of my improved attachment. Fig. 2 is a side elevation showing the same applied to the pan, the latter being shown in section.

Like numerals of reference indicate like parts in the different views.

Referring now to the details of the drawings, 1 designates a bracket or casting or support which is designed to carry and support the other parts of the attachment. On this bracket is affixed in any suitable manner a bell 2, which is designed to be sounded by the depression of the hammer-arm 3, which is slidably mounted in the casing of the bell in a well-known manner.

The bracket 1 comprises a main portion 4, the downwardly-inclined shorter member 5, and the connecting portion 6, all as clearly shown in the drawings.

7 is a float-lever pivotally mounted, as at 8, on the upper part of the connecting portion 6 and carrying at one end a float 9 of any suitable construction, which is adapted to be disposed within the pan 10 and to be buoyed by the water 11 therein, as seen in Fig. 2. The other end of this float-lever is provided with the hook member 12, which is designed to engage with the hook member 13 on the adjacent end of the horizontal portion 14 of the arm 15, which latter is disposed substantially vertically and has at its lower end the lateral portion or member 16, which is pivotally mounted, as at 17, on the lug or ear 18 of the bracket 1. The outer end of the portion 14 carries a weight 19.

The manner of application and use will be readily understood from the foregoing description when taken in connection with the annexed drawings. As seen in Fig. 2, the device is applied to the pan 10 in the following manner: The bracket 1 is placed in position with its shorter member 5 within the pan, a screw or the like 20 being adjustably mounted in the lower end of the said member 5 and adapted to be engaged with the inner wall of the pan, as shown. A similar screw or equivalent device 21 is adjustably mounted in the lower end of the member 4 of the bracket and is adapted to engage the outer wall of the pan in a plane below the point of engagement of the screw 20 therewith, and by adjustment of this screw 21 the position of the bracket may be adjusted so as to change the relative position of the float, so that it will be made to actuate the alarm at any desired water-level, the screw 20 of course being tightened or loosened, as may be required, and afterward tightened to hold the attachment securely in place. When once adjusted, the hooked members 12 and 13 are engaged with each other, and the weighted arm 14 is held up in the position in which it is seen in Fig. 2 till the float 9 reaches the predetermined height, when the hooked member 12 will be moved out of its engagement with the hooked member 13, and the weight 19 will cause the arm 15 to assume the position seen in Fig. 2, causing the horizontal portion 16 thereof to strike the enlarged head 22 of the hammer-arm 3 and depress the same and sound the alarm to notify the servant or other person that the pan requires to be emptied.

If it is desired to have the alarm sounded when the water has reached a lower level than that shown, the screw 21 is screwed in, so as to tilt the bracket 1 and throw the shorter member 5 downward within the pan, thus bringing the float-arm downward and the float normally farther into the pan.

Modifications in detail may be resorted to without departing from the spirit of the invention or sacrificing any of its advantages. For instance, the float may be round or of any other desired shape, and its lever may be of other shape in cross-section.

What is claimed as new is—

1. A drip-pan attachment, comprising a bracket, means for attaching the same to a pan, a float pivotally mounted on said bracket, and an alarm mounted on the bracket and comprising a pivotally-mounted weighted arm normally engaged with and controlled by the float.

2. A drip-pan attachment comprising a bracket with long and short members, adjusting and securing means mounted in said members, an alarm carried by one member, a float, a float-lever pivotally mounted on the said bracket, and a weighted arm pivotally mounted on said bracket and adapted to engage the float-lever as and for the purpose specified.

3. A drip-pan attachment comprising a bracket with long and short members, adjusting-screws mounted in said members, a float-lever pivotally mounted on said bracket and carrying at one end a float and at the other a hook, an alarm mounted on the bracket and having a slidingly-mounted hammer-arm, and a weighted arm pivotally mounted on the bracket and having a horizontal portion with a hook to engage the hook of the float-lever and a vertical portion with lateral portion at its lower end to contact with and depress the hammer-arm as the hooks are disengaged, as set forth.

Signed by me at Killingly, Connecticut, this 11th day of March, 1903.

ALDEI BESSETTE.

Witnesses:
OLIVER E. GETTY,
LANDRUSE BERNIER.